April 13, 1965 J. L. HART 3,178,257
FLOCCULATION OF SELENIUM FROM A BASIC MEDIUM
Filed July 26, 1962 2 Sheets-Sheet 1

INVENTOR
J. L. HART DECEASED
BY DARALL G. HAWK, SPECIAL ADMINISTRATOR

BY Young & Quigg
ATTORNEYS

April 13, 1965 J. L. HART 3,178,257
FLOCCULATION OF SELENIUM FROM A BASIC MEDIUM
Filed July 26, 1962 2 Sheets-Sheet 2

INVENTOR.
J.L. HART DECEASED
BY DARALL G. HAWK, SPECIAL ADMINISTRATOR
BY Young & Quigg
ATTORNEYS

United States Patent Office 3,178,257
Patented Apr. 13, 1965

3,178,257
FLOCCULATION OF SELENIUM FROM
A BASIC MEDIUM
James L. Hart, deceased, late of Bartlesville, Okla., by
Darall G. Hawk, special administrator, Bartlesville,
Okla., assignor to Phillips Petroleum Company, a corporation of Delaware
Filed July 26, 1962, Ser. No. 212,744
10 Claims. (Cl. 23—14.5)

This invention relates to the flocculation of elemental selenium from a basic medium. In one aspect it relates to the use of a metal ammonium complex as a flocculating agent for elemental selenium produced from water soluble selenium compounds in the pregnant liquor of the carbonate leach process for recovery of uranium values from their ores.

Many of the ores which are now being treated for the recovery of uranium values by means of the carbonate leach process contain selenium compounds in varying amounts. In recycling the barren liquor after precipitation and separation of the uranium as yellow cake, the selenium values build up in the plant system to an appreciable level. Since selenium is currently being used in the manufacture of rectifiers, diodes, transistors and the like, the selenium content of this carbonate leach stream represents a large amount of a product which is salable at many locations.

In the copending application Serial No. 860,771, filed December 21, 1959, of R. E. Reusser, now abandoned, a process is taught for conversion and separation of the water soluble selenate compounds from the pregnant liquor.

In one embodiment of that invention, by treating with an agent, such as sodium sulfide, and permitting subsequent oxidation, the elemental selenium is removed by the referenced method prior to the precipitation of the dissolved uranium values by the addition of caustic soda.

Alternatively, the clarified pregnant liquor stream can be first reduced with a reducing agent, preferably aluminum powder, which will precipitate out the uranium values, as well as reducing the soluble selenates to soluble selenides. The resulting slurry of insoluble tetravalent uranium compounds is handled in the same manner as the uranium precipitate formed after selenium removal in the first described embodiment, except that now after separation of the precipitated uranium values, the leach solution is treated to convert the remaining soluble selenide compounds to valuable, elemental selenium. The selenium is separated before the barren solution is recycled to the leaching circuit.

Precipitated elemental selenium has proved difficult to remove from an aqueous medium on standard filtration equipment. Some means of efficiently removing as much elemental selenium as possible on each pass through the separation zone as practical is desired.

In the embodiment shown in FIGURE 1, experience has shown that contacting the pregnant liquor with a treating agent, such as sodium sulfide, is sufficient to effect precipitation of elemental selenium from soluble selenates. Applicant has discovered that by treating the precipitated selenium compounds with copper ammonium sulfate, that the precipitate flocculates quickly, and settles well, whereby a more efficient separation of the elemental selenium from the pregnant liquor is achieved.

Accordingly, it is an object of this invention to permit efficient separation of precipitated elemental selenium formed from the carbonate leach liquor in the process of recovery of uranium values from their ores.

It is a further object of this invention to provide a process for flocculating precipitated elemental selenium in a process in which selenate compounds are converted by sulfide treatment to the elemental form.

Further objects, as well as aspects and advantages inherent in this method of selenium separation will become apparent upon studying the accompanying disclosure and drawing.

Figure 1:
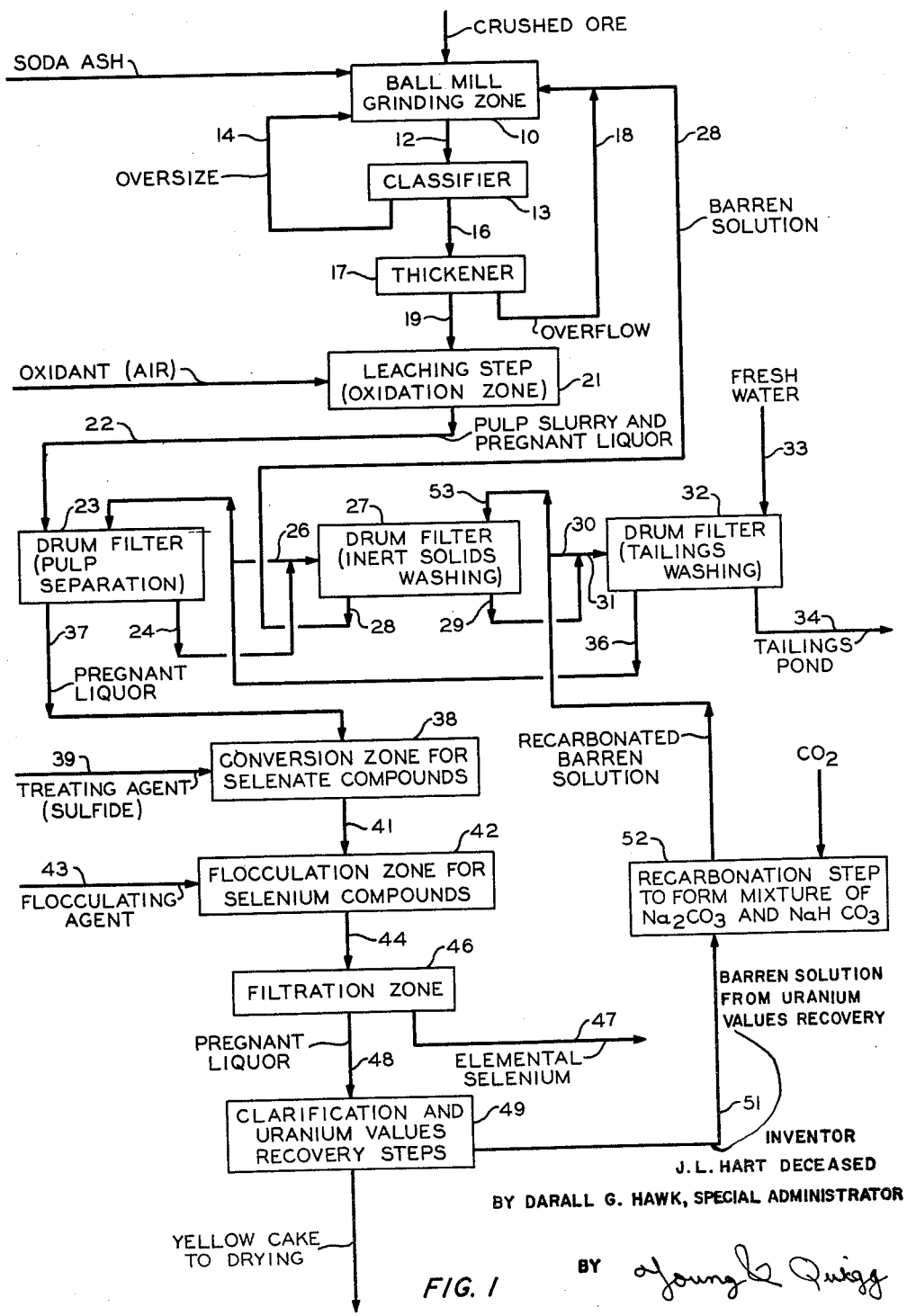
FIGURE 1 is a process diagram depicting the carbonate least process for the recovery of uranium values from their ores including the step of selenium recovery prior to precipitating the uranium values.

Referring now to the drawing, in which like parts have been designated by like reference numerals, and to FIGURE 1 in particular, and beginning at the top of the diagram; crushed, uranium-bearing ore and soda ash are introduced to the ball mill grinding zone 10 wherein the ore is ground to a fine condition in the presence of water, sodium carbonate (soda ash) and sodium bicarbonate (in the barren solution recycle). An ore slurry leaves the ball mill and passes on through line 12 to classifier 13 wherein oversized particles are returned to ball mill 10 via conduit 14, and the remaining fine ore slurry passes through line 16 to a thickener 17. From the thickener, overflow is returned by a conduit 18 to the grinding step, while the thickened slurry goes through conduit 19 to leaching step 21 wherein the oxidation and dissolution of the uranium and certain other elements of the ore takes place. The slurry is contacted with oxygen by passing air therethrough, and maintained at a predetermined temperature for a period of time so as to cause the uranium values to go into solution as the sodium uranyl tricarbonate complex, forming what is termed in the art, a pregnant liquor.

The pregnant liquor and pulp slurry leave oxidation zone 21 through conduit 22 and enter vacuum drum filter 23, wherein the pulp and the pregnant liquor are separated. The pulp, principally composed of inert solids, passes through conduits 24 and 26 to a second vacuum drum filter 27, wherein the inert solids are washed with part of a recycled, recarbonated barren solution. The filtrate from this filter passes through conduit 28 back to the ball mill grinding zone 10. The solids (tailings) from filter 27 passing through conduit 29 are combined with the balance of recarbonated barren solution from conduit 30 before passing through conduit 31 into a third drum filter 32. The tailings are washed in zone 32, but now with fresh water introduced through conduit 33 and finally passed through conduit 34 to a tailings pond for disposal. The filtrate from filler 32 is passed through conduit 36, part being used as feed to the spray of filters 23, and the remainder being used to slurry the pulp in conduit 24.

The pregnant liquor filtrate from filter 23 passes through conduit 37 to a conversion zone 38, wherein the soluble selenate compounds are converted to insoluble selenium by the introduction of a treating agent through line 39, which is indicated by the solution in zone 38 turning black, and spontaneously, a greenish black precipitate forms, indicating the formation of elemental selenium, and probably elemental sulfur. A slurry of these compounds in the pregnant liquor then passes via conduit 41 to a flocculation zone 42, wherein the elemental selenium precipitate is flocculated by the introduction of the novel flocculating agent through line 43. The resulting flocculated slurry passes via conduit 44 to a filtration zone 46, wherein elemental selenium is separated and passed through conduit 47 for further purification and use, as previously discussed.

The filtrate from filtration zone 46, now a substantially elemental selenium-free pregnant liquor, moves on through line 48 to a series 49 of steps including clarification, precipitation or other recovery means, thickening, washing, and drying of the yellow cake product. The barren solution in conduit 51 passes through a zone 52 where it is recarbonated with flue gas, or the like, before passing to the drum filtration zone, specifically filters 28 and 32, after combining with the tailings in conduit 29. This recarbonated barren solution after passing through the drum filters, finally reaches conduit 28 through which it passes back to ball mill grinding zone 10.

Figure 2:
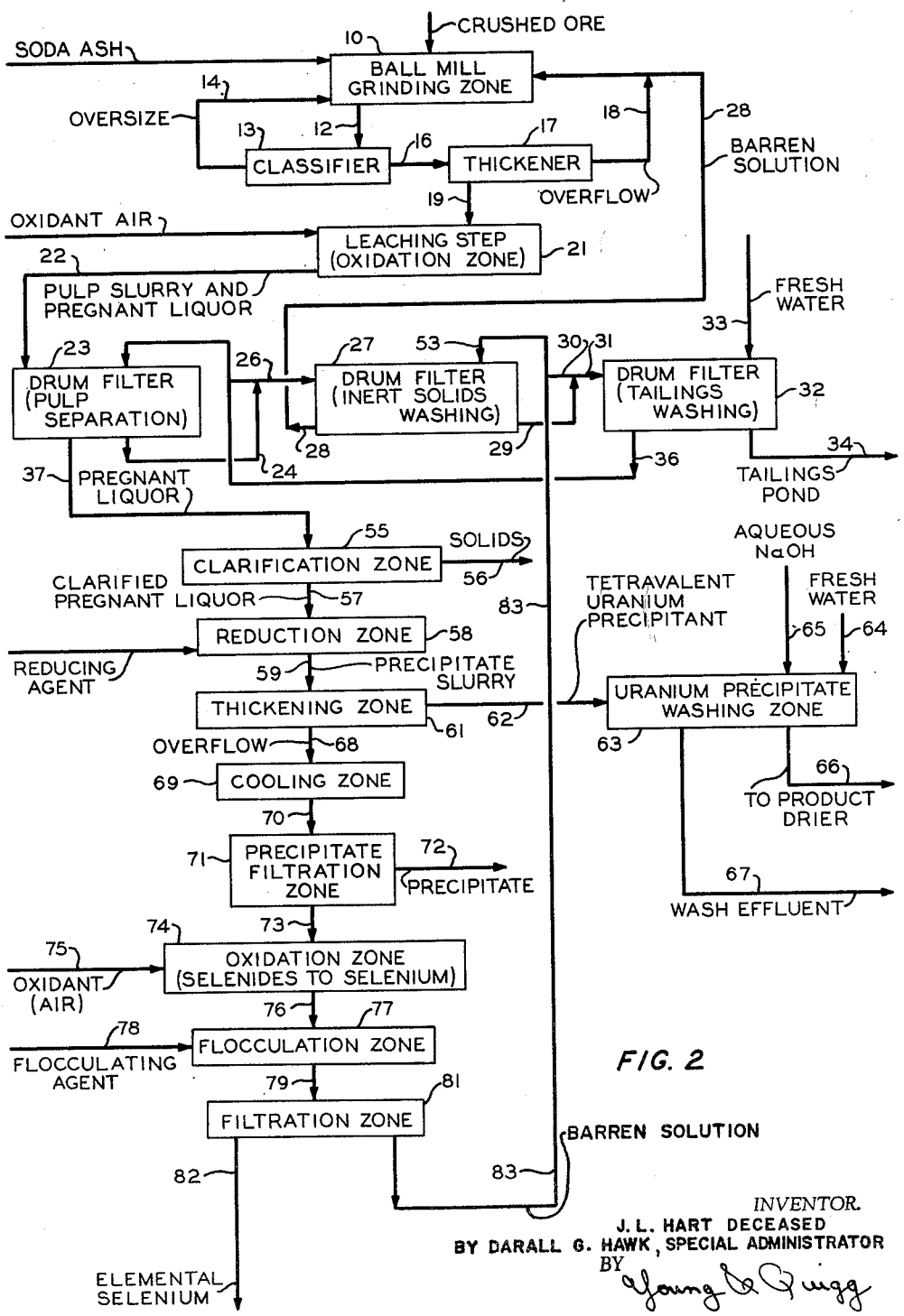
FIGURE 2 is a process diagram depicting another embodiment of the same process wherein selenium is recovered subsequent to the precipitation of the uranium values.

In FIGURE 2, crushed, uranium-bearing ore and soda ash are introduced to the ball mill grinding zone 10, wherein the ore is ground to a fine condition in the presence of water, sodium carbonate (soda ash) and sodium bicarbonate. An ore slurry leaves the ball mill and passes on through conduit 12 to classifier 13, wherein oversize particles are returned to the ball mill 10 via conduit 14, and the remaining fine ore slurry passes through conduit 16 to a thickener 17. From the thickener, overflow is returned via conduit 18 to the grinding step, while the thickened slurry goes from conduit 19 to leaching step 21, wherein the oxidation and dissolution of uranium ore takes place. The slurry is contacted with oxygen, by passing air therethrough, and maintained at a predetermined temperature for a period of time to cause uranium values to go into solution as the sodium uranyl tricarbonate complex, forming what is termed in the art, a pregnant liquor. The pulp slurry and pregnant liquor leave oxidation zone 21 through conduit 22 and enter drum filter 23, wherein the pulp is separated from the pregnant liquor. The pulp, principally composed of inert solids, passes through conduits 24 and 26 to a second drum filter 27, wherein the inert solids are washed with part of a recycled, recarbonated barren solution. The filtrate from filter 27 passes through conduit 28 back to ball mill grinding zone 10. The inert solids (tailings) pass from filter 27 through conduit 29, are combined with the balance of recarbonated barren solution from a conduit 30 before passing through conduit 31 into a third filter 32. In filter 32 the tailings are washed with fresh water introduced through conduit 33, before being passed through conduit 34 to a tailings pond for disposal. The filtrate from filter 32 passes through conduit 36 part being used as feed to the sprays of filter 23, the remainder being used to slurry the pulp in conduit 26.

The pregnant liquor filtrate from filter 23 passes through conduit 37 to a clarification step 55, wherein any finely divided solids present are removed via conduit 46. The clarified pregnant liquor from zone 55 passes through conduit 57 to reduction zone 58, wherein a reducing agent, such as aluminum, effects the reduction of both selenate compounds to soluble selenide compounds, and the soluble hexavalent uranium compounds to insoluble tetravalent uranium compounds. The slurry from reduction zone 58 passes through conduit 59 to a thickening zone 61, wherein the tetravalent uranium compound precipitate is drawn off as the underflow through conduit 62 to precipitate washing zone 63. The precipitate is normally washed with fresh water introduced through conduit 64, and is then passed through conduit 66 to the product dryer. Alternatively, if undesired cooling takes place in zone 58, such that a minor amount of aluminum hydroxide precipitates upstream of, or in thickening zone 61, thus contaminating the product passing to zone 63, the product can be washed with aqueous sodium hydroxide therein, 10% by weight NaOH for example, which is introduced via conduit 65. In either case, wash effluent is removed from zone 63 via conduit 67. The overflow from thickening zone 61 passes through conduit 68 to cooling zone 69, e.g. an indirect heat exchanger, wherein the temperature of the solution is lowered to a temperature below 50 C., thus causing the precipitation of aluminum hydroxide. The resulting slurry then passes through conduit 70 to precipitate filtration zone 71, wherein the precipitate is filtered out and removed via conduit 72. The filtrate passes via conduit 73 to oxidation zone 74, wherein an oxidant, such as air, is introduced through conduit 75 to oxidize soluble selenide compounds to insoluble selenium.

The slurry from zone 74 passes via conduit 76 to a flocculation zone 77, wherein the precipitated selenium is flocculated by the introduction of the novel flocculating agent through conduit 78. The resulting flocculated slurry passes via conduit 79 to a filtration zone 81, wherein elemental selenium is separated and passes through conduit 82 to final purification and use. The filtrate from zone 81 passes through conduit 83 back to the drum filtration zone, specifically filters 27 and 32.

In carrying out the process of this invention, carbonate leach liquor which contains soluble selenium compounds is treated to form a suspension of selenium in carbonate leach liquor which is then flocculated with copper ammonium sulfate. The amount of copper ammonium sulfate which is used is generally within the range from 0.2 to 0.6 pound of the flocculating agent per pound of selenium present in the carbonate leach liquor prior to selenium precipitation. Since the conversion treatment generally effects a selenium precipitation of from 20–35 percent, one can also base the amount of flocculating agent on the selenium which is present in the suspension. The treatment of the selenium suspension with the flocculating agent is generally carried out at a temperature of from 50–200 F., preferably below 150 F. The time of treatment is generally less than one hour, although it is necessary to obtain good contacting of the suspended selenium with the flocculating agent.

Copper ammonium sulfate, the flocculating agent of this invention, is a well known complex inorganic compound, and its molecular formula is $Cu(NH_3)_4SO_4$. This complex can be conveniently prepared by treating copper sulfate with ammonia in aqueous solution.

It is also within the scope of this invention to add commercial flocculating agents to the copper ammonium sulfate, if faster flocculating times are desired. As will be shown hereinafter in the specific examples, such commercial flocculating agents will not cause the flocculation of the suspended selenium when used alone, thus it is necessary that some copper ammonium sulfate be employed. If mixtures of the copper ammonium sulfate and commercial flocculating agents are used, the amount of copper ammonium sulfate present in the mixtures will generally be above 50 percent by weight of the mixture. Some examples of commercial flocculating agents which can be used in admixture with the copper ammonium sulfate are water soluble polymeric materials (believed to be acrylic polymers) such as Separan and the various Aeroflocs, and various types of guar gums, such as Burtonite and Jaquar.

The flocculation of precipitated selenium by the process of this invention allows one to move the precipitated selenium or filtrates at high rates. Flocculation also enables one to use thickeners of smaller size and lower residence times in thickeners.

The selenium precipitate contains large quantities of copper from the copper ammonium complex which is used as the flocculating agent. Since selenium purification plants purchase selenium concentrates from copper manufacturers, and said concentrates contain large amounts of contaminating copper, the selenium precipitate from the present process can be handled by those manufacturers without requiring drastic changes in the purification process. However, if it is desired to purify the precipitated selenium before sale, one can dissolve the precipitated copper-selenium concentrate in concentrated sulfuric acid and reprecipitate the selenium by the addition of $SO_2$.

Regarding the embodiment of FIGURE 2, the solution must still be contacted with air in zone 74, to oxidize the selenides to the elemental form. The second conversion step is carried out at a temperature between 20 and 100 C., preferably at a temperature above 70 C. Any suitable oxidizing agent can be employed but it is most convenient to use air as the agent. The amount of oxygen theoretically required is ½ mole per mole of selenium present, although it is necessary to introduce a very large excess of air to insure complete conversion. It is preferred to use from 10 to 1000 moles of oxygen per mole of selenium, said oxygen being supplied by bubbling air through the solution at a rate sufficient to supply this volume of the oxidizing agent. Generally, the second conversion step will require from 2 to 40 hours, although longer times can be used if desired. At these retention times, air rates of from 2 to 20 liters per hour per liter of solution are quite satisfactory.

Following the second conversion step, the elemental selenium is flocculated according to the teaching of this invention. As a result, the elemental selenium is readily separated from the system on conventional filtration equipment.

Generally, the present invention is considered applicable to the flocculation of elemental selenium from any basic medium.

The following specific examples are intended to illustrate the advantages of the flocculating process of this invention, but it is not intended that this invention be limited to the specific embodiments shown therein.

*Example I*

A series of runs was carried out in which it was unsuccessfully attempted to flocculate precipitated selenium with commerical flocculating agents. However, satisfactory flocculation was obtained by use of copper ammonium sulfate.

In these runs, a selenium suspension was prepared by treating 1000 ml. of pregnant carbonate leach liquor with 4 ml. of a solution containing 0.139 gram of sodium sulfide per ml. The pregnant carbonate leach liquor which was used contained 3.64 grams per liter $U_3O_8$, 0.574 gram per liter of $V_2O_5$, 1.80 grams per liter of molybdenum, 0.70 gram per liter selenium, 34.26 grams per liter of sodium carbonate, 14.86 grams per liter of sodium bicarbonate and 81 grams per liter of sodium sulfate. The thus-treated mixture was stirred and allowed to stand for 10 minutes, after which the mixture was divided into 100 ml. aliquots. To each 100 ml. aliquot was added 2 ml. of an 0.05 percent by weight aqueous solution of the following commercial flocculating agents: High molecular weight polyethylene oxide (Polyox), Burtonite, Superfloc 16, Aerofloc 3171, Aerofloc 550, and Aerofloc 3000. After stirring the slurry, it was allowed to stand for 10 minutes, and an additional 2 ml. of each of the reagents was added. None of these commercial reagents appeared to flocculate the suspended selenium precipitate.

When 2 ml. of 1 percent by weight solution of $(Cu(NH_3)_4SO_4 \cdot CuSO_4 \cdot 5H_2O$ complexed with ammonia) was added to 100 ml. of this selenium slurry, the precipitate flocculated and settled well. The filtrate analyzed 0.482 gram per liter of selenium, representing 31 percent precipitation.

*Example II*

In still another series of tests, one liter of a pregnant uranium carbonate leach liquor was treated with 4 ml. of a solution containing 0.139 gram of sodium sulfide per ml. Prior to the sulfide treatment, the leach liquor contained 0.691 gram per liter of selenium. Aliquots of 100 ml. of the solution were treated with various reagents in 1 percent solution in an attempt to flocculate the selenium precipitate. The results of these runs are expressed below in the table.

| Reagent Added | Comments [1] |
|---|---|
| 4.5 ml. of 1% soln. of $Al_2(SO_4)_3$ | No flocculation. |
| 4.5 ml. of 1% soln. of $FeSO_4$ | Do. |
| 4.5 ml. of 1% soln. of $ZnSO_4$ | Do. |
| Kerosene 2 ml. | Do. |
| Pyridine 2 ml. | Do. |
| Roten 205H 4 ml., 0.1% | Do. |
| Aliquat 6 1 ml. | Do. |
| Aliquat 26 3 ml. | Do. |
| Aliquat 336 3 ml. | Do. |
| Aliquat 4 3 ml. | Do. |
| Acintol FA1 8 drops | Do. |
| (Tert. Octylamine 0.5 ml.) | Do. |
| $Cu(NH_3)_4SO_4$ 3.0 ml. of 1% soln. | Started to floc in 30 mins. |
| (Separan 0.05% soln. 2 ml.) (Then $Cu(NH_3)_4SO_4$ 3.0 ml. of 1% soln.). | Flocculated after 30 mins., but not as good as adding in reverse order. |
| $(Cu(NH_3)_4SO_4$ 2.0 ml. of 1% soln. (Separan 0.05% soln. 2 ml.). | Flocculated and started to settle in 15 mins. |
| $NH_4OH$ conc. 4 ml.) | No flocculation. |
| (Aliquat 6 0.5 ml.). | Do. |
| (Separan 0.05% soln. 2 ml.) (NaCN 0.1 g.). | Selenium precipitate dissolved. |
| (Separan 0.05% soln. 2 ml.) NaCN 0.01 g. | Do. |

[1] Observations made 30 minutes after reagent addition.

*Example III*

One liter of the pregnant uranium carbonate leach liquor of the previous examples, containing 0.691 gram per liter of selenium was treated with 1.5 ml. sodium sulfide solution containing 0.139 gram of sodium sulfide per ml. It was found that 2 ml. of a 1 percent copper ammonium sulfate solution plus 2 ml. of an 0.05 percent aqueous Separan flocculated the precipitate in 100 ml. of this slurry very rapidly. When 1 ml. additional sodium sulfide solution was added to the remaining 900 ml. of slurry, the same quantity of copper and Separan again flocculated 100 ml. of the slurry. Reducing the copper added to 1.5 ml. of 1 percent aqueous copper ammonium sulfate per 100 ml. of slurry did not achieve flocculation. When 0.6 ml. additional sodium sulfide solution was added to the remaining 700 ml. of slurry, it was found that 4.0 ml. of the copper complex solution was required to flocculate 100 ml. of the slurry.

The data of Example III demonstrates the minimum amount of sulfate compound required to achieve significan flocculation.

*Example IV*

Two liters of pregnant uranium carbonate leach liquor containing 0.691 gram per liter of selenium were treated with 6.0 ml. sodium sulfide solution containing 0.139 gram of sodium sulfide per ml. The slurry was stirred for 5 minutes, and 40 ml. of copper ammonium sulfate complex solution was added with stirring. The complex was prepared by adding 1 gram of $CuSO_4 \cdot 5H_2O$ and 4 ml. concentrated ammonium hydroxide to 100 ml. water. After 2 minutes, the precipitate was flocculated. After 5 minutes' standing, the precipitate had settled to ½" in a total liquid height of 14.5". After 1.5 hours, the precipitate occupied only ¼" in height, and the supernatant liquid was quite clear. This supernatant liquor contained 0.434 gram per liter selenium, thus 37 percent of the selenium was precipitated.

The solids from the above tests, composited with the solids from two of the similar tests were slurried to give a 4.3 percent solids slurry in water. This slurry was tested for filtration rate, and it was found that the rate was 550 pounds of dry solids per square foot per day using a nylon cloth. The dry solids contain 18.5 weight percent copper and 40 weight percent selenium.

The data of Example IV demonstrates the dense flocculant achieved by the practice of this invention. Further, it shows that good filtration rates are obtained with elemental selenium flocculated according to this invention.

What is claimed is:

1. In a process for recovering precipitated elemental selenium from a basic aqueous medium, the improvement comprising the introduction of a sufficient amount of copper ammonium sulfate to a slurry containing elemental selenium prior to passing the latter to a selenium separation zone, thereby permitting efficient separation of the resulting flocculated elemental selenium in said zone.

2. In a process for recovering precipitated elemental selenium from a basic aqueous medium, the improvement comprising the introduction of a sufficient amount of copper ammonium sulfate and a conventional flocculating agent selected from the group consisting of water-soluble polymeric materials and guar gums to said elemental selenium prior to passing the latter to a selenium separation zone, thereby permitting efficient separation of the resulting flocculated elemental selenium in said zone.

3. In a process for recovering uranium and selenium values from an ore, which comprises oxidizing an aqueous slurry of comminuted uranium-containing ore in the presence of a leaching solution in a leaching vessel; forming a pregnant liquor containing a dissolved water soluble hexavalent uranyl compound and water-soluble selenate compounds, recovering uranium values from said pregnant liquor, converting the water soluble selenate compounds in said liquor with a sulfide treating agent to elemental selenium, recovery of said selenium from said liquor which is a basic medium, and recycling the barren solution from the uranium values and elemental selenium recovery steps to the leaching circuit, the improvement which comprises the introduction of a sufficient amount of copper ammonium sulfate between the zone in which elemental selenium is formed and the selenium separation zone to flocculate said elemental selenium, thereby permitting efficient separation of flocculated elemental selenium in said separation zone.

4. In a process for recovering uranium and selenium values from an ore, which comprises oxidizing an aqueous slurry of comminuted uranium-containing ore in the presence of a leaching solution in a leaching vessel; forming a pregnant liquor containing a dissolved water soluble hexavalent uranyl compound and water-soluble selenate compounds, recovering uranium values from said pregnant liquor, converting the water soluble selenate compounds in said liquor with a sulfide treating agent to elemental selenium, recovery of said selenium from said liquor which is a basic medium, the improvement which comprises the introduction of a sufficient amount of copper ammonium sulfate between the zone in which elemental selenium is formed and the selenium separation zone to flocculate said elemental selenium, thereby permitting efficient separation of flocculated elemental selenium in said separation zone.

5. The process of claim 3 wherein said sulfate is added in an amount ranging between 0.2 and 0.6 pound to each pound of selenium present in the pregnant liquor prior to the selenate compound conversion step.

6. In a process for recovering uranium and selenium values from an ore which comprises oxidizing an aqueous slurry of comminuted uranium-containing ore in the presence of a leaching solution in a leaching vessel, forming a pregnant liquor containing a dissolved water soluble hexavalent uranyl compound and water-soluble selenate compounds, treating water soluble selenate compounds with sodium sulfide to form insoluble elemental selenium, separating said selenium from the resulting basic slurry in a filtration zone, recovering uranium values from said pregnant liquor, and recycling the barren solution to the leaching circuit, the improvement which comprises the introduction of a sufficient amount of copper ammonium sulfate between the zone in which elemental selenium is formed and the selenium filtrate zone to flocculate said elemental selenium, thereby permitting efficient separation of soluble elemental selenium in said filtration zone.

7. The process of claim 6 wherein said sulfate is added in an amount ranging between 0.2 and 0.6 pound to each pound of selenium present in the pregnant liquor prior to the selenate compound conversion step.

8. In a process for recovering uranium and selenium values from an ore which comprises oxidizing an aqueous slurry of comminuted uranium-containing ore in the presence of a leaching solution in a leaching vessel, forming a pregnant liquor containing a dissolved water soluble hexavalent uranyl compound and water-soluble selenate compounds, concomitantly reducing water soluble selenate compounds to soluble selenide compounds and soluble hexavalent uranium values to an insoluble tetravalent uranium compound with a reducing agent, recovering uranium values from the resulting uranium precipitate slurry, oxidizing said selenide compounds with an oxidant to insoluble elemental selenium, recovering elemental selenium from the resulting basic slurry in a filtration zone, and recycling the barren solution from the recovery steps to the leaching circuit, the improvement which comprises the introduction of a sufficient amount of copper ammonium sulfate between the zone in which elemental selenium is formed and the selenium filtration zone to flocculate said elemental selenium, thereby permitting efficient separation of soluble elemental selenium in said filtration zone.

9. The process of claim 8 wherein said sulfate is added in an amount ranging between 0.2 and 0.6 pound to each pound of selenium present in the pregnant liquor prior to the selenate compound conversion step.

10. In a process for recovering uranium and selenium values from an ore which comprises oxidizing an aqueous slurry of comminuted uranium-containing ore in the presence of sodium carbonate and sodium bicarbonate in a leaching vessel, forming a pregnant liquor containing a dissolved water soluble hexavalent uranyl compound and water-soluble selenate compounds, concomitantly reducing water soluble selenate compounds to soluble selenide compounds and soluble hexavalent uranium values to an insoluble tetravalent uranium compound with a reducing agent, recovering uranium values from the resulting uranium precipitate slurry, oxidizing said selenide compounds with an oxidant to insoluble elemental selenium, recovering elemental selenium from the resulting selenium slurry in a filtration zone, and recycling the barren solution from the recovery steps to the leaching circuit, the improvement which comprises the introduction of a sufficient amount of copper ammonium sulfate between the zone in which elemental selenium is formed and the selenium filtration zone to flocculate said elemental selenium, thereby permitting efficient separation of soluble elemental selenium in said filtration zone.

No references cited.

UNITED STATES PATENT OFFICE
CERTIFICATE OF CORRECTION

April 13, 1965

Patent No. 3,178,257

James L. Hart, deceased, by
Darall G. Hawk, special administrator

It is hereby certified that error appears in the above numbered patent requiring correction and that the said Letters Patent should read as corrected below.

Column 8, line 11, for "filtrate" read -- filtration --.

Signed and sealed this 21st day of December 1965.

(SEAL)
Attest:

ERNEST W. SWIDER
Attesting Officer

EDWARD J. BRENNER
Commissioner of Patents